United States Patent [19]
Schwarz

[11] Patent Number: 6,007,421
[45] Date of Patent: Dec. 28, 1999

[54] TEMPERATURE CONTROL DEVICE

[75] Inventor: Stefan H. Schwarz, Rochester Hills, Mich.

[73] Assignee: Valeo Climatisation, La Verriere, France

[21] Appl. No.: 08/938,678

[22] Filed: Sep. 26, 1997

[51] Int. Cl.[6] .................................................. B60H 1/12
[52] U.S. Cl. ........................ 454/156; 137/601; 454/160; 454/267
[58] Field of Search ............................. 454/69, 156, 159, 454/160, 161, 266, 267, 269; 137/601; 251/298

[56] References Cited

U.S. PATENT DOCUMENTS

| | | | |
|---|---|---|---|
| 3,318,225 | 5/1967 | May | 454/267 |
| 3,650,318 | 3/1972 | Avery | 454/267 X |
| 3,994,335 | 11/1976 | Perkins | 137/601 X |
| 4,852,639 | 8/1989 | Horiguchi et al. | 454/160 X |

FOREIGN PATENT DOCUMENTS

| | | | |
|---|---|---|---|
| 1366049 | 6/1964 | France | 454/267 |
| 2 480 685 | 10/1981 | France | 454/159 |
| 30 39 148 | 4/1981 | Germany | 454/156 |
| 57-18516 | 1/1982 | Japan | 454/156 |
| 63-112209 | 5/1988 | Japan | 454/156 |
| 1-186416 | 7/1989 | Japan | 454/159 |
| 89/03006 | 4/1989 | WIPO | 454/267 |

*Primary Examiner*—Harold Joyce
*Attorney, Agent, or Firm*—Morgan & Finnegan, LLP

[57] ABSTRACT

The air mixing device, for use in an air conditioning apparatus or a vehicle heater system as a flow control device which consists of at least two flap members, the flap members being mutually independently movable between first and second positions in which they respectively obturate first and second air inlet openings.

26 Claims, 2 Drawing Sheets

TEMPERATURE CONTROL DEVICE

FIELD OF THE INVENTION

The present invention relates to a device for selectively obscuring heated and cooled air openings to an air mixing device and to a heating or air conditioning apparatus incorporating such a device.

BACKGROUND OF THE INVENTION

An air conditioning apparatus for a motor vehicle conventionally includes an air mixing chamber having two inlets, one for cooled air directly received from an evaporator and the other for heated air which has been passed over a heater core. A so-called "blend door" device pivots between a first position in which it substantially closes the first opening and a second position in which it substantially closes the second opening. Controls, such as hand-operated controls, set the position of the blend door either to one of the first or second positions, or to an intermediate position.

The air conditioning apparatus also has a number of outlets from the air mixing chamber, the outlets being connected via suitable conduits to different parts of the vehicle cabin, for example to the drivers side and to the passengers side.

A disadvantage of the known apparatus is that different temperatures exist within the air mixing chamber and thus that depending upon the location of the outlet within the chamber, different temperatures may be delivered to different parts of the vehicle cabin. The reason for the differing temperatures in the air mixing chamber lies in the different flow properties of the heated and the cooled air. Referring to FIG. 1, it will be seen that the cooled air arrives at a mixing chamber directly from the evaporator, whereas the heated air also emanates from the evaporator, but then passes through the heater core, which restricts air flow.

It will therefore be clear to one skilled in the art that with the conventional device the effect of the cooled air will predominate, at least on the left hand side, as shown in FIG. 1.

It is an object of the present invention to mitigate the above-mentioned difficulties.

SUMMARY OF THE INVENTION

According to the present invention there is provided a flow control device for selectively pivoting to obscure a first or second opening into an air mixing chamber wherein said flow control device comprises plural independently pivotal flap members.

Preferably each flap member has a surface portion which overlaps the surface portion of an adjacent flap member.

Preferably there are provided at least three said flap members, and said flow control device further comprises a coupling member for coupling together two non-adjacent of said flap members, whereby said two flap members move together.

According to a second aspect of the present invention there is provided an air mixing device comprising walls, said walls defining an air mixing chamber and further defining first and second openings into said chamber, one of said first and second openings being for heated air, and further comprising a flow control device, said flow control device being moveable with respect to said openings between first and second positions, whereby in said first position said flow control device obscures the first opening and in said second position said flow control device obscures said second opening, wherein said flow control device comprises at least two flap members, said flap members being mutually independently moveable between said first and second positions.

Preferably said flap members are pivotal about a common axis.

Preferably the air mixing device further comprises setting means for moving one of said flap members independently of another of said flap members.

Preferably each flap member has a surface portion which overlaps the surface portion of a respective adjacent flap member.

According to a third aspect of the present invention there is provided an air mixing device comprising walls, said walls defining an air mixing chamber and further defining first and second openings into said chamber, one of said first and second openings being for heated air, and further comprising a flow control device, said flow control device being moveable with respect to said openings between the first and second positions whereby in said first position said flow control device obscures the first opening and in said second position said flow control device obscures said second opening, wherein said flow control device comprises at least three flap members, said flap members being mutually independently moveable between said first and second positions, and said flow control device further has a coupling member for coupling together two non-adjacent of said flap members whereby said two flap members move together.

Preferably each flap member has a surface portion which overlaps a surface portion of a respective adjacent flap member.

Preferably in one of said first or second positions, said flap members cooperate together substantially to seal the respective opening.

BRIEF DESCRIPTION OF THE DRAWINGS

The present invention will now be described with respect to the preferred embodiment thereof, with respect to the accompanying drawings in which.

DESCRIPTION OF THE PREFERRED EMBODIMENTS

Figure 1:
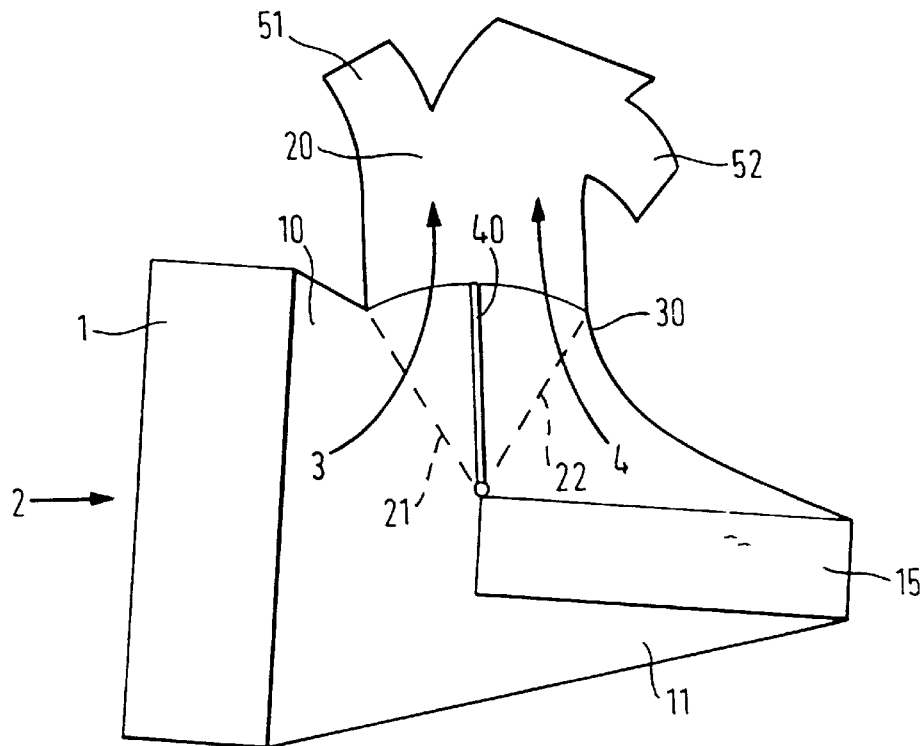
FIG. 1 shows a partial cross-sectional view through a conventional air conditioning system.

Referring to FIG. 1, an air conditioning device has an evaporator (1) which receives an air flow (2) in known fashion, for example from an inlet for ambient air or from a vehicle-cabin inlet if re-circulation is desired. In use the evaporator is supplied with coolant and the outlet air flow (3) from the evaporator is thereby cooled. The outlet air of the evaporator is fed via a first passage (10) to an air mixing chamber (20) defined by the walls (30) of the air conditioning apparatus and via a second passageway (11) through a heater core (15). The heater core (15) heats the air flow to provide a heated air flow (4) to the air mixing chamber (20).

The first passage (10) has an opening (21) into the air mixing chamber (20), and the outlet of the heater core (15)

passes through a second opening (22), of substantially similar size to the first opening (21), into the air mixing chamber (20). A blend door (40) is moveable from a first position where it abuts the opening (21) so as to substantially seal the opening (21) and a second position where it abuts the opening (22) so as substantially to seal the opening (22). Setting apparatus (not shown in this figure) allows the blend door to be set to either the first or second positions, or to positions intermediate the first and second positions, for example the intermediate position shown in FIG. 1.

It will be clear to one skilled in the art that the air flowing through opening (21) will flow at a higher velocity than that flowing through opening (22) due to the impedance effect of the heater core (15) in the second passage (11). The consequence of this is that a larger volume of cooled air per unit time will enter the mixing chamber (20). The average temperature of the air in the mixing chamber can be controlled by selecting a different position of the blend door and the blend door could thus be moved in an anticlockwise direction so as to rather more obscure the flow of cold air so as to achieve a desired average temperature in the mixing chamber. However, the more rapidly flowing cool air will still tend to predominate on the left hand side (as seen in FIG. 1). As a result, air-outlets such as outlet (51) on the left hand side of the air mixing chamber will tend to have colder air than air mixing outlets such as outlet (52) on the right hand side of the chamber.

Figure 2:
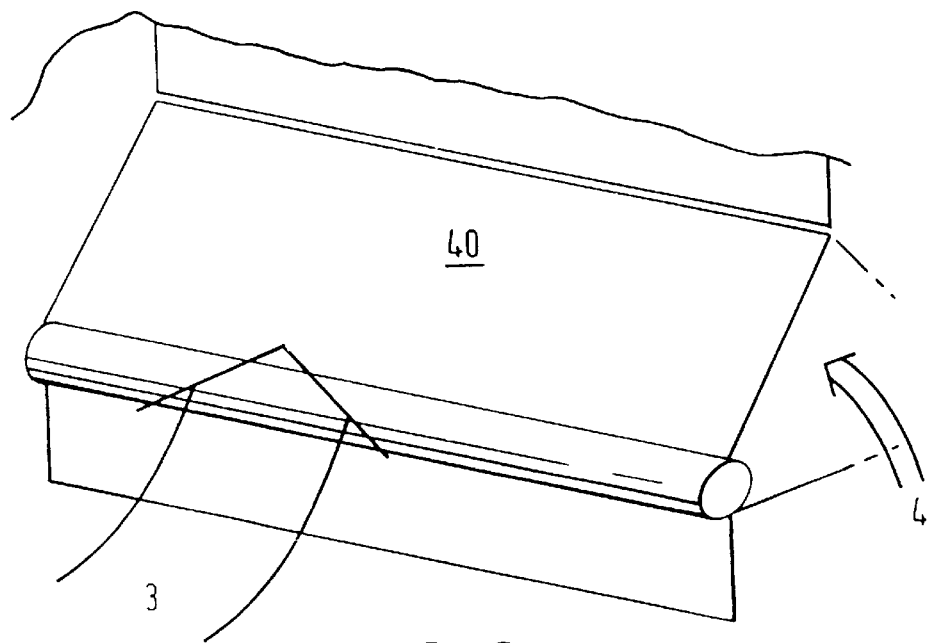
FIG. 2 shows the blend door device of the ai: conditioning apparatus of FIG. 1.

FIG. 2 shows the blend door device (40) of FIG. 1 in the second position, such that flow of heated air into the mixing chamber is substantially prevented.

Figure 3:
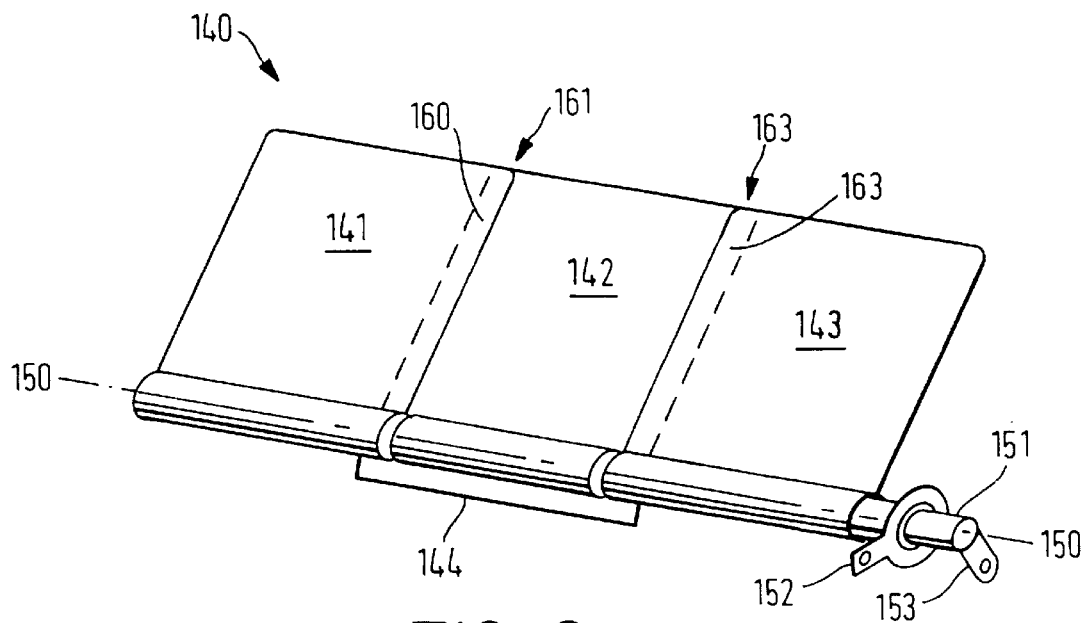
FIG. 3 shows a perspective view of a blend door device in accordance with the present invention.

Referring now to FIG. 3, a blend door device in accordance with the present invention is shown.

The blend door device (140) consists of three flap members (141,142,143). Each of the flap members is a substantially similar planar body of plastic material, the three flap members pivotally hinged at one end thereof about a common axis (150). It would alternatively be possible to use other materials, for example metal, which could be stamped or cast for instance. The first and third flap members (141,143) are connected together by a coupling (144) and are pivotally mounted on an axle (151). A first crank member (152) is secured to the third flap member (143) so that rotation of the crank member will cause the first and third flap members to rotate on the axle (151).

The second flap member (142) is rigidly secured to the axle (151), and at one end of the axle a second crank member (153) is secured so that rotation of the flap member (153) causes the second flap member (142) to rotate independently of the first and third flap members (141,143).

It would also be possible for the two flap members to be on separate axles disposed close together.

Continuing to refer to FIG. 3, it will be seen in the embodiments shown that the first flap member (141) has a surface portion (160) which overlaps an adjacent portion (161) of the second flap member (142) with the flap member (142) lying under the flap member (141) in the position shown. Likewise, at the other end of flap member (142) the third flap member (151) has a portion (162) which overlaps the underlying portion (163) of the second flap member (142).

It would alternatively be possible for the flap members to abut along their edges. Sealing together is highly desirable. It would also be possible for the flap members to engage separate openings defined by the housing.

It will thus be apparent to one skilled in the art that movement of the second flap member (142) in an anticlockwise member will cause, by virtue of the engagement of the second flap member with the first and third flap members, all three of the flap members to move in an anticlockwise direction. Alternatively, it is possible to move the first crank member (153) in an anticlockwise direction so as to move the first and third flap members (141,143) and then to move the second flap member (142) via the second crank member (153) to a desired position.

Figure 4:
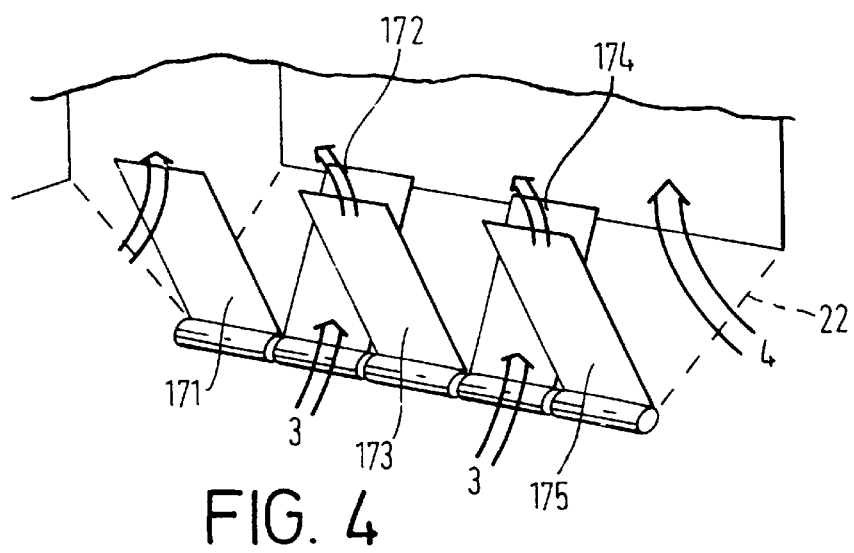
FIG. 4 shows a partial perspective view of an air conditioning apparatus in accordance with the second embodiment of present invention.

FIG. 4 shows a second embodiment of the blend door device in accordance with the invention, this time having five flap members (171,172,173,174,175). Referring to FIG. 4 the first, third and fifth flap members are shown in a position which closes portions of the cold air opening (21) whereas the second and fourth flap members (172,174) are closing the hot air opening (22). The effect of this is to open three flow passages for heated air, and two flow passages for cooled air. However, because the second and fourth flap members are fully opened, the cooled air flows across the full width of the air mixing chamber as does the heated air from the outlets caused by the opened flap members (171, 173,175).

As a result, stratification of the air flow in the air mixing chamber is reduced and improved mixing occurs.

It will be understood by one skilled in the art that the flow control device can be used in conventional heater systems, i.e. without an evaporator, or in any situation where two air flows are to be mixed together.

Although preferred embodiments of the invention have been described it will be clear that the invention is not to be limited thereto but instead has the full extent defined by the appended claims.

I claim:

1. A flow control device adapted to selectively pivot to obstruct a first or a second opening of an air mixing chamber comprising at least three flap members, wherein each of said flap members is pivotal about a common axis.

2. The flow control device of claim 1, wherein each flap member has a surface portion, which overlaps a surface portion of an adjacent flap member.

3. The flow control device of claim 1, further comprising:
   a coupling member adapted to couple together two non-adjacent of said flap members, whereby said two non-adjacent flap members pivot together.

4. An air mixing device comprising:
   a plurality of walls defining an air mixing chamber and further defining a first and a second opening into said chamber, one of said first and second openings being for heated air; and
   a flow control device moveable with respect to said openings between a first and a second position, whereby in said first position said flow control device obstructs the first opening, and in said second position said flow control device obstructs said second opening;
   wherein said flow control device comprises at least three flap members moveable between said first and second positions, wherein each of said flap members is pivotal about a common axis.

5. The air mixing device of claim 4, further comprising:
   a setting means adapted to pivot at least one of said flap members.

6. The air mixing device of claim 4, wherein each flap member has a surface portion, which overlaps a surface portion of a respective adjacent flap member.

7. The air mixing device of claim 4, wherein the device is disposed within an air conditioning apparatus so that one of said first and second opening is capable of receiving cooled air flows from an evaporator and the other of said first and second openings is capable of receiving heated air flows from a heater core.

8. The air mixing device of claim 4, wherein the plurality of walls further defines a third opening adapted as an outlet, and wherein the device is disposed within a vehicle so that one of said first and second opening is capable of receiving cooled air flows from an evaporator, and the other of said first and second openings is capable of receiving heated air flows from a heater core, and the third opening is operatively connected to a cabin of the vehicle.

9. An air mixing device comprising:
a plurality of walls defining an air mixing chamber and further defining a first and a second opening into said chamber, one of said first and second openings being for heated air; and
a flow control device movable with respect to said openings between first and second positions, whereby in said first position said flow control device obstructs the first opening, and in said second position said flow control device obstructs said second opening,
wherein said flow control device comprises: (1) at least three flap members adapted to pivot about a common axis between said first and second positions, and (2) (a) coupling member configured to couple together two non-adjacent of said flap members, whereby said two non-adjacent flap members move together.

10. The air mixing device of claim 9, wherein each of said flap member has a first surface portion, which overlaps an adjacent surface portion of an adjacent flap member.

11. The air mixing device of claim 10, further comprising a setting means adapted to pivot each one of said non-coupled flap members.

12. The air mixing device of claim 9, wherein in one of said first or second positions, said flap members cooperate together substantially to seal a respective one of said openings.

13. The air mixing device of claim 9, wherein the device is disposed within an air conditioning apparatus so that one of said first and second opening is capable of receiving cooled air flows from an evaporator, and the other of said first and second openings is capable of receiving heated air flows from a heater core.

14. The air mixing device of claim 9, wherein the plurality of walls further defines a third opening adapted as an outlet, and wherein the device is disposed within a vehicle so that one of said first and second opening is capable of receiving cooled air flows from an evaporator, and the other of said first and second openings is capable of receiving heated air flows from a heater core, and the third opening is operatively connected to a cabin of the vehicle.

15. A temperature control device for an air mixing chamber comprising:
a shaft; and
at least three flap members, each of which is said flap members adapted to control temperature of an effluent of the chamber by controlling flow rates into the chamber
wherein each of said flap members pivot about a common axis defined by the shaft;
wherein adjacent flat members overlap.

16. The device of claim 15, further comprising at least one crank member coupling together a plurality of exclusive sets of non-adjacent flap members, each said crank member adapted to pivot one of said exclusive sets about an axis defined by the shaft.

17. The device of claim 15, further comprising:
a lever attached to each of said flap members adapted to pivot said flap member independently of the other flap members.

18. The device of claim 15, wherein the device has five pivotal flap members, and further comprises a pair of crank member coupling together a plurality of exclusive sets of non-adjacent flap members, each said crank member adapted to pivot one of said exclusive sets about an axis defined by the shaft.

19. The device of claim 15, wherein the device has two lateral flap members and a median flap member interposed between the two lateral flap members, and a crank member coupling the two lateral flap members.

20. The device of claim 15, wherein the device has two lateral flap members and a median flap member interposed between the two lateral flap members, and a crank member coupling the two lateral flap members.

21. A device comprising:
a chamber defining a hot air opening and a cold air opening; and
a flow control device disposed to guide an air stream through the hot air opening at a first angular position, through the cold air opening at a second angular position, and through both the hot air and the cold air openings at angular positions between the first and second angular position, said flow device having at least one shaft, and at least three pivotal flap members, wherein said flap members pivot about a common axis, wherein adjacent flap members overlap.

22. The device of claim 21, further comprising a lever attached to each of said flap members adapted to pivot said flap member.

23. The device of claim 21, wherein the device has at least three pivotal flap members, and further comprises a crank member coupling together a plurality of exclusive sets of non-adjacent flap members, whereby said sets of flap members pivot together about the shaft.

24. The device of claim 23, wherein the device has two lateral flap members and a median flap member interposed between the two lateral flap members, and a crank member coupling the two lateral flap members.

25. The device of claim 21, wherein the chamber further defines a outlet opening, and wherein the device is disposed within a vehicle air conditioning system so that the hot air opening receives an air stream from a heat core of the vehicle air conditioning system, and the cold air opening receives a cold air stream from an evaporator of the vehicle air conditioning system, and the outlet opening is operatively connected to a cabin of the vehicle.

26. A device comprising:
a chamber defining a hot air opening and a cold air opening;
a flow control device disposed to guide an air through the hot air opening at a first angular position, through the cold air opening at a second angular position, and through both the hot air and the cold air openings at angular positions between the first and second angular position, having at least one shaft, and two lateral flap members and a median flap member interposed between the two lateral flap members, and a crank member coupling the two lateral flap members, wherein the pivotal flap members are independently hinged to the at least one shaft to pivot about a common axis; and
a lever attached to each of said flap members adapted to pivot said flap member independently of the other flap members;
wherein the lateral flap members pivot together about the shaft, and
wherein adjacent flap members overlap.

* * * * *